United States Patent Office

GEORGE W. DISMAN, OF CHESTERVILLE, OHIO.

Letters Patent No. 69,783, dated October 15, 1867

IMPROVED ALLOY FOR JOURNAL-BOXES AND OTHER PURPOSES.

*The Schedule referred to in these Letters Patent and making part of the same.*

TO ALL WHOM IT MAY CONCERN:

Be it known that I, GEORGE W. DISMAN, of Chesterville, in the county of Morrow, and State of Ohio, (formerly of Upper Sandusky, in the county of Wyandot, and State of Ohio,) have invented or discovered a new and useful Composition for Journal-Boxes or Bearings, and other mechanical purposes; and I do hereby declare the following to be a full, clear, and exact description of the same.

On the 27th day of February, 1866, Letters Patent of the United States were granted to me for an improved composition for journal-boxes, and which was composed substantially of one pound of copper, four ounces of glass, one ounce of borax, half an ounce of prussiate of potash, eight ounces of lead. The lead was for some purposes reduced in quantity and sometimes omitted, and when so reduced or omitted the quantity of borax and prussiate of potash was increased. The composition so made was valuable for many purposes, but it was found to be porous or spongy, and my attention was turned to the discovery of something which would remedy this defect in the composition. After much experiment, I found that to substitute tin for the lead the difficulty was corrected, and the tendency of the glass to make the composition porous was corrected or counteracted by the use of tin. I also found that the proportions could be changed to great advantage to the composition.

My present invention consists in the production of a composition for journal-boxes, bearings, and other purposes, made of the following ingredients, and in about the following proportions: One pound of copper, four ounces of glass, from one-half to one ounce of borax, half an ounce of prussiate of potash, one ounce of tin. The composition may be mixed in a fused state in a crucible or furnace of any kind suitable for such purpose. The copper and glass may be first melted, and then the borax and prussiate of potash introduced, and last the tin may be put into the composition. The tin condenses the metal and makes it solid, the tendency of the glass being to make it porous or spongy. This compound or composition may be poured immediately into the boxes or bearings from the crucible or furnace where it is made, or it may be made into bars or in bulk, as a commercial article, for such purposes as it may be designed or useful for.

Among other things for which this composition may be used is that for making bells, the metal having a clear ringing sound, its texture giving to it, on being struck, a very quick vibration. It may be used for many purposes, and I propose to introduce it into the market as a commercial article.

Having thus described my invention, what I claim therein as new, and desire to secure by Letters Patent, is—

A composition for journal-boxes, bearings, and other mechanical purposes, composed of copper, glass, borax, prussiate of potash, and tin, as herein described and for the purposes specified.

G. W. DISMAN

Witnesses:
A. B. STOUGHTON,
EDM. F. BROWN.